UNITED STATES PATENT OFFICE.

ERHARD LUDWIG MAYER AND HENRY LIEPMANN, OF LONDON, COUNTY OF MIDDLESEX, ENGLAND.

TREATMENT OF POROUS POTS FOR ELECTRIC BATTERIES.

SPECIFICATION forming part of Letters Patent No. 417,392, dated December 17, 1889.

Application filed April 17, 1889. Serial No. 307,562. (No specimens.) Patented in England July 20, 1887, No. 10,177.

*To all whom it may concern:*

Be it known that we, ERHARD LUDWIG MAYER and HENRY LIEPMANN, both subjects of the Queen of Great Britain, residing at London, in the county of Middlesex, England, have invented certain new and useful Improvements in the Manufacture and Treatment of Porous Pots, Plates, or Partitions for Electric Batteries, (for which we have received Letters Patent in England, No. 10,177, dated July 20, 1887;) and we do hereby declare that the following is a full, clear, and exact description of the invention, which will enable others skilled in the art to which it appertains to make and use the same.

Our invention relates to improvements in the manufacture and treatment of porous pots, plates, or partitions for electric batteries, whereby certain advantages are obtained.

The invention also relates to the article produced by our novel method.

A drawback which exists in the porous pots, plates, or partitions as at present constructed lies in the fact that it is extremely difficult or even impossible to make them of such uniform structure and composition that they will always offer a constant resistance to the passage through them either of the electrolyte or electrolytes with which they are employed or of a constituent or constituents thereof. As at present manufactured the porous pots, plates, or partitions vary enormously in resistance among themselves, and those suited for any particular purpose can only be separated and chosen by a system of careful selection.

The object of our invention is to overcome this drawback and to enable porous pots, plates, or partitions to be constructed of any desired and predetermined resistance, so as to be exactly suited for the purpose for which they are to be employed—that is, suited to the nature of the battery materials with which they are to be in contact.

In carrying our invention into effect we employ pots, plates, or partitions constructed of biscuit-ware or of porous earthenware after the usual manner, but preferably of as open a texture as is convenient, and in order to bring them up to the requisite resistance we precipitate or deposit in their pores and on their surface bodies of such nature that when the porous pots, plates, or partitions are in use the said bodies will not themselves enter into any chemical action with the electrodes or electrolytes, (or otherwise undergo chemical or physical change,) which will be deleterious to the action of the battery. In bringing about such precipitation or deposition we impregnate the porous pots, plates, or partitions with a suitable compound or chemical reagent, and this we cause to be acted upon by another suitable compound or chemical reagent, so that a body such as we have hereinbefore mentioned—namely, one which will not enter into any chemical reaction with the electrodes or electrolytes with which it may come in contact, (or otherwise undergo chemical or physical alteration,) which would be deleterious to the action of the battery—is separated and precipitated or deposited in the pores or interstices and on the surface of the said porous pots, plates, or partitions. We desire it to be understood that the body which is to be precipitated or deposited may exist either in the compound or reagent with which the porous pots, plates, or partitions are first impregnated in the compound or reagent which is afterward applied.

Having thus described in general terms the nature and object of our invention, we shall now proceed to describe in what manner it is to be or may be carried into effect, and for this purpose we shall describe by way of an example or type one way of carrying out our invention.

In the following description we show specifically how we may perform our invention in the case of a porous partition-plate, and we desire it to be understood that such description applies equally well when a porous pot or porous cell is treated instead of a porous plate.

As a convenient way of treating a plate we first prepare a solution of silicate of soda containing as little free alkali as possible, or, in other words, having as large a proportion of silicic acid present as is possible. Into this we plunge a plate and allow it to soak for a period of, say, six to twelve hours, such period varying with the thickness and density of the plate. We then remove the plate from the solution, wipe it, and immerse it in a ten-per-cent. solution of sulphuric acid and leave it to soak therein for a period of, say, six to twelve hours. We then remove the plate, wash it in clean water, and dry it at about the temperature of boiling water for the purpose of abstracting the water of combination from and rendering pulverulent or crystalline the gelatinous silicic acid in the pores and interstices of the plate. If after so treating by this process the plate has not been raised to the required resistance, the process must be carried out a second time, using more dilute solutions.

It will be observed that in our process the deposition of the granular matter in the pores or on the surface of the porous material may be effected electrolytically.

It will be seen that by means of our invention any desired predetermined resistance of the porous pots, plates, or partitions may be obtained. In the use of the article the passage of the electrolyte through the same is by a true diffusion of aqueous solutions.

Having thus fully described our invention, what we claim, and desire to secure by Letters Patent, is—

1. The method of increasing the resistance of a porous pot, plate, or partition for electric batteries without destroying the porosity of said pot, plate, or partition, which consists in depositing within or upon the same a substance unattackable by the constituents of the battery.

2. The method of increasing the resistance of a porous pot, plate, or partition for electric batteries without destroying the porosity of said pot, plate, or partition, which consists in depositing within or upon the same a granular substance unattackable by the constituents of the battery.

3. The improvement in the manufacture or treatment of porous pots, plates, or partitions for electric batteries, consisting in impregnating them with a suitable compound or chemical reagent and causing them to act upon or be acted upon by another suitable compound or chemical reagent, and subsequently changing the character of the resultant body precipitated or deposited in the pores or interstices of said porous pot, plate, or partition, so that such body shall not itself enter into any chemical action with the electrodes or electrolytes (or otherwise undergo any deleterious change) detrimental to the action of the battery.

4. An improved porous pot, plate, or partition for electric batteries, substantially as herein set forth, which consists in a porous material having deposited in the pores or on the surface thereof substance unattackable by the constituents of the battery.

5. An improved porous pot, plate, or partition for electric batteries, substantially as hereinbefore set forth, which consists in a porous material having deposited in the pores or on the surface thereof granular substance, which shall not itself enter into any chemical action with the electrodes or electrolytes (or otherwise undergo any deleterious change) detrimental to the action of the battery.

6. The improvement in the manufacture or treatment of porous pots, plates, or partitions for electric batteries, consisting in impregnating them with silicate of soda or potash, treating the same with acid to precipitate the silicic acid, then dehydrating the precipitated silicic acid to produce a granular material unattackable by the battery-fluids.

7. The improvement in the manufacture or treatment of porous pots, plates, or partitions for electric batteries, consisting in impregnating them with silicate of soda or potash, treating the same with acid to precipitate the silicic acid, then dehydrating the precipitated silicic acid by heating the same to produce a granular material unattackable by the battery-fluids.

ERHARD LUDWIG MAYER.
HENRY LIEPMANN.

Witnesses:
J. G. LORRAIN,
C. H. THOMAS.